(12) United States Patent
Kim et al.

(10) Patent No.: US 11,906,041 B2
(45) Date of Patent: Feb. 20, 2024

(54) TRANSMISSION FOR VEHICLE

(71) Applicant: SL Corporation, Daegu (KR)

(72) Inventors: Yong Hyun Kim, Gyeongsan-si (KR);
Sang Ho Moon, Gyeongsan-si (KR);
Young Jae Cho, Gyeongsan-si (KR);
Jae Gu Choi, Gyeongsan-si (KR);
Hong Jun Cha, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/194,558

(22) Filed: Mar. 31, 2023

(65) Prior Publication Data
US 2023/0332681 A1 Oct. 19, 2023

(30) Foreign Application Priority Data
Apr. 15, 2022 (KR) .......................... 10-2022-0047011

(51) Int. Cl.
*F16H 59/10* (2006.01)
*F16H 59/02* (2006.01)

(52) U.S. Cl.
CPC ....... *F16H 59/105* (2013.01); *F16H 59/0278* (2013.01)

(58) Field of Classification Search
CPC ......... F16H 2061/243; F16H 2061/247; F16H 2059/047; F16H 2061/242; F16H 61/24
See application file for complete search history.

(56) References Cited

U.S. PATENT DOCUMENTS 11,236,818 B2 * 2/2022 Soave .................... B60K 20/04

FOREIGN PATENT DOCUMENTS

JP 2014156153 A * 8/2014

* cited by examiner

*Primary Examiner* — Gregory Robert Weber
(74) *Attorney, Agent, or Firm* — United One Law Group LLC; Kongsik Kim; Jhongwoo Peck

(57) ABSTRACT

A transmission for a vehicle includes a shift lever rotatable around a rotation axis so that one of a plurality of shift stages is selected; a pawl member disposed in the shift lever to be movable in a radial direction with respect to the rotation axis; a detent plate including a plurality of detent grooves formed therein and arranged along a rotational direction of the shift lever so that the pawl member is inserted into each of the plurality of detent grooves corresponding to each of the plurality of shift stages; and a shift lever actuator that rotates the shift lever. The shift lever actuator includes a driving unit; and a driven unit that is rotated about the rotation axis by the driving unit to cause the pawl member to move in the radial direction and to apply a force to the pawl member in the rotation direction of the shift lever.

16 Claims, 18 Drawing Sheets

TRANSMISSION FOR VEHICLE

CROSS-REFERENCE TO RELATED APPLICATION

This application claims priority from Korean Patent Application No. 10-2022-0047011 filed on Apr. 15, 2022, which is incorporated herein by reference in its entirety.

BACKGROUND

1. Technical Field

The present disclosure relates to a transmission for a vehicle, and more particularly, to a transmission for a vehicle that allows a shift stage to be switched without a driver's shift manipulation.

2. Description of Related Art

In general, the transmission for the vehicle may vary a gear ratio to keep the rotational speed of an engine constant based on a speed of the vehicle. A driver manipulates a shift lever to adjust the gear ratio.

Recently, an electronic transmission such as a shift-by-wire transmission has been introduced to the vehicles, which allows the transmission to be controlled based on an electrical signal according to the driver's shift lever manipulation without transmitting the driver's shift lever manipulation force to the transmission via a mechanical cable or linkage.

The electronic transmission transfers the electric signal generated based on a position change of the shift lever to an actuator provided in the transmission, and the gear stage of the transmission is shifted by an operation of the actuator.

Studies are being actively conducted to enable remote driving or remote parking without the driver's shift manipulation to improve the driver's convenience. To this end, a scheme for automatically switching the shift stage by changing the position of the shift lever during remote driving or remote parking is required.

SUMMARY

In view of this need, the present disclosure provides a transmission for a vehicle that allows a shift lever to be rotated to a position corresponding to a target shift stage without a driver's shift manipulation.

Purposes according to the present disclosure are not limited to the above-mentioned purpose. Other purposes and advantages according to the present disclosure that are not mentioned may be understood from following descriptions, and may be more clearly understood based on embodiments according to the present disclosure. Further, it will be easily understood that the purposes and advantages according to the present disclosure may be realized using means shown in the claims and combinations thereof.

According to an aspect of the present disclosure, a transmission shifter for a vehicle may include a shift lever rotatable around a rotation axis, thereby allowing one of a plurality of shift stages to be selected; a pawl member disposed in the shift lever so as to be movable in a radial direction with respect to the rotation axis; a detent plate including a plurality of detent grooves formed therein and arranged along a rotational direction of the shift lever so that the pawl member is capable of being inserted into each of the plurality of detent grooves corresponding to each of the plurality of shift stages; and a shift controller that rotates the shift lever to allow a shift stage to be shifted from one of the plurality of shift stages to another thereof, based on a shift signal. In particular, the shift controller may include a driving unit; and a driven unit that is rotated about the rotation axis by a driving force transmitted from the driving unit to cause the pawl member to move in the radial direction with respect to the rotation axis, and to apply a force to the pawl member in the rotation direction of the shift lever to rotate the shift lever.

The shift lever may include an elastic member that elastically supports the pawl member in the radial direction with respect to the rotation axis.

Each of the plurality of detent grooves may include an opening into which the pawl member is configured to be inserted, and the opening be open toward the rotation axis.

The shift controller may allow the pawl member to move closer to the rotation axis so that the pawl member is dislodged from a detent groove corresponding to a current shift stage among the plurality of detent grooves, thereby permitting the shift lever to rotate, and, in response to the shift lever having been rotated to a position corresponding to a target shift stage, the shift controller may allow the pawl member to move away from the rotation axis so that the pawl member is inserted into a detent groove corresponding to the target shift stage among the plurality of detent grooves.

The transmission shifter for a vehicle may further include a position sensor unit for detecting a position of the shift lever. Accordingly, a shift stage among the plurality of shift stages may be determined based on the position of the shift lever detected by the position sensor unit, and the position sensor unit may include a magnet mounted on the shift lever, and a magnetic sensor for detecting a magnetic force transmitted from the magnet.

The shift lever may include a movement hole defined therein for guiding a movement of the pawl member, and the movement hole may extend in the radial direction with respect to the rotation axis so as to allow the pawl member to move in the radial direction with respect to the rotation axis, and to prevent the pawl member from moving relative to the shift lever in the rotation direction of the shift lever.

The shift controller may further include a driving force transfer member for transmitting the driving force to the driven unit, and the driving force transfer member may include at least one transfer gear.

The driven unit may include a gear unit that is rotated by the driving force of the driver; and a shift guide that is rotated with the gear unit to cause the shift lever to be rotated.

The gear unit may include an input gear that is rotated around the rotation axis by the driving force generated from the driving unit; an output gear to which the shift guide is connected, the output gear including gear teeth configured to be engaged with gear teeth of the input gear, allowing the output gear to be rotated about the rotation axis with the rotation of the input gear; a gear cover coupled to the input gear; and a pressing member disposed between the input gear and the gear cover.

The pressing member may apply a force to the input gear so that the input gear and the output gear are engaged with each other and rotate together. In response to an external force being applied to the output gear, the pressing member may be elastically deformed to allow the input gear to move away from the output gear along the rotation axis so that the gear teeth of the input gear and the gear teeth of the output gear are permitted to slip with respect to each other.

Both opposing ends of the shift guide may be connected to the output gear such that a combination of the shift guide and the output gear forms a closed curve. The shift guide may include a first guide disposed such that a distance between the rotation axis and the first guide is equal to or greater than a distance between the rotation axis and each of the plurality of detent grooves; a second guide formed at one side of the first guide in a rotation direction of the shift lever, the second guide being disposed such that a distance between the rotation axis and the second guide is equal to or smaller than a distance between the rotation axis and each of the plurality of detent grooves; a connector connected to and disposed between the first guide and the second guide; and an extension that extends from the output gear and is connected to the second guide.

A proximal end of the connector connected to a distal end of the second guide may be disposed farther outward from the first guide in the rotation direction of the shift lever than a distal end of the connector connected to the first guide, and as the shift guide rotates, the pawl member may move from one of the first guide or the second guide toward the other thereof along a contact surface of the connector.

As the shift guide rotates, the extension may apply a force to the pawl member disposed at the second guide, and the shift lever may be rotated due to the extension applying the force to the pawl member.

The shift guide may rotate in a first direction so that the pawl member moves from the first guide toward the second guide along the contact surface of the connector, so that the pawl member is dislodged from a detent groove corresponding to a current shift stage among the plurality of detent grooves. While the pawl member is disposed at the second guide, the shift guide may allow the extension to apply a force to the pawl member in the first direction to cause the shift lever to be rotated to a position corresponding to a target shift stage. Further, in response to the shift lever having been rotated to the position corresponding to the target shift stage, the shift guide may rotate in a second direction opposite to the first direction so that the pawl member moves from the second guide toward the first guide along the contact surface of the connector, such that the pawl member is inserted into a detent groove corresponding to the target shift stage among the plurality of detent grooves.

The transmission shifter for a vehicle may further include a position sensor unit for detecting a position of the shift guide, and the position sensor unit may include a magnet mounted on the shift guide, and a magnetic sensor for detecting a magnetic force transmitted from the magnet.

The transmission shifter for a vehicle may further include a bullet disposed in the shift lever so as to be movable in the radial direction with respect to the rotation axis; an elastic member that elastically supports the bullet; and a detent groove including a plurality of grooves arranged along a rotation path of the bullet. An end of the bullet may be inserted into each of the plurality of grooves so that a manipulation feeling is generated when the shift lever rotates.

The transmission for the vehicle of the present disclosure may provide one or more of the following effects. During remote parking or remote driving, the shift lever may be rotated to a position corresponding to the target shift stage without the driver's shift manipulation such that the driver's convenience may be improved.

The effects of the present disclosure are not limited to the effects mentioned above, and other effects will be clearly understood by those skilled in the art from the disclosure.

BRIEF DESCRIPTION OF DRAWINGS

The above and other aspects and features of the present disclosure will become more apparent by describing in detail illustrative embodiments thereof with reference to the attached drawings, in which.

DETAILED DESCRIPTIONS

Figure 1:
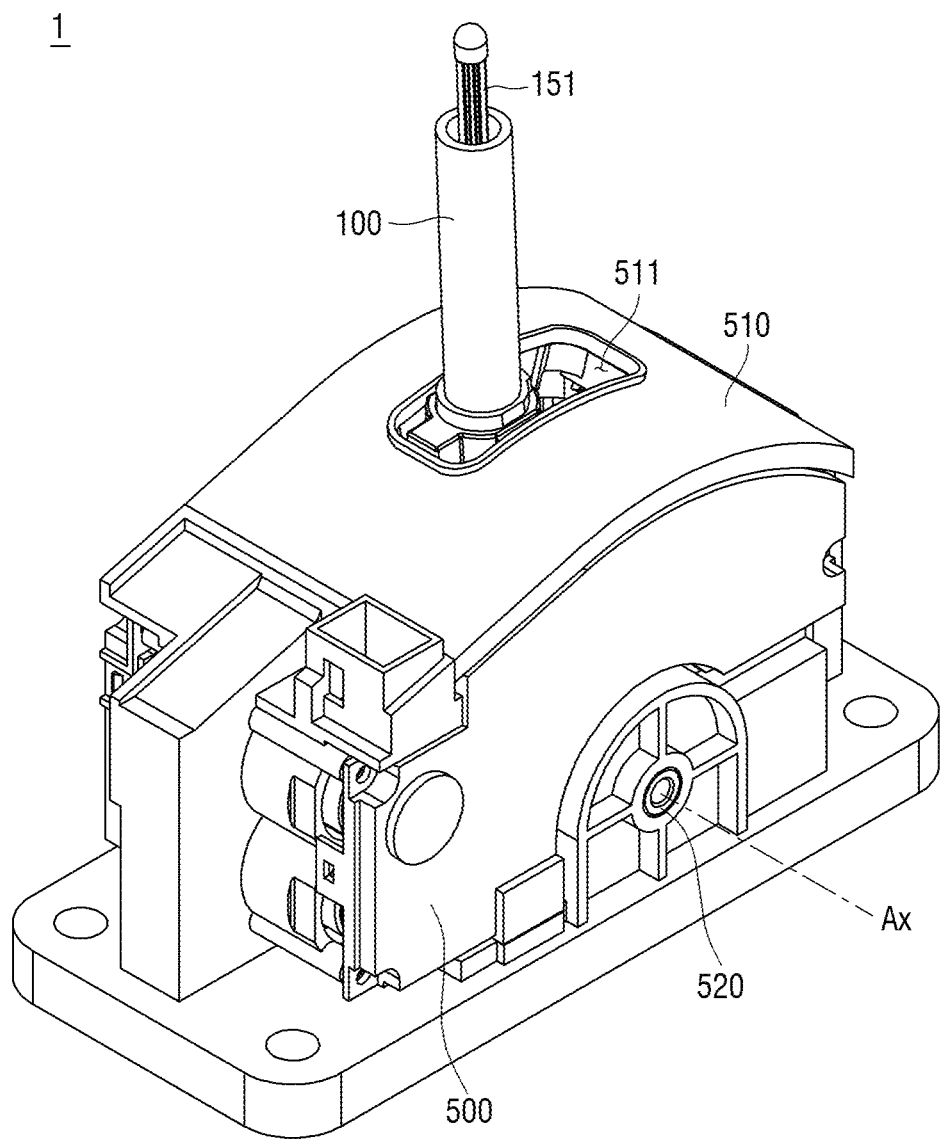
FIG. 1 is a perspective view showing an exterior of a transmission for a vehicle according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as being limited to the particular shapes of regions illustrated herein but are to include deviations in shapes that result, for example, from manufacturing. In the drawings, respective components may be enlarged or reduced in size for convenience of explanation.

Hereinafter, the present disclosure will be described in detail with reference to drawings for illustrating a transmission for a vehicle according to embodiments of the present disclosure.

Figure 2:
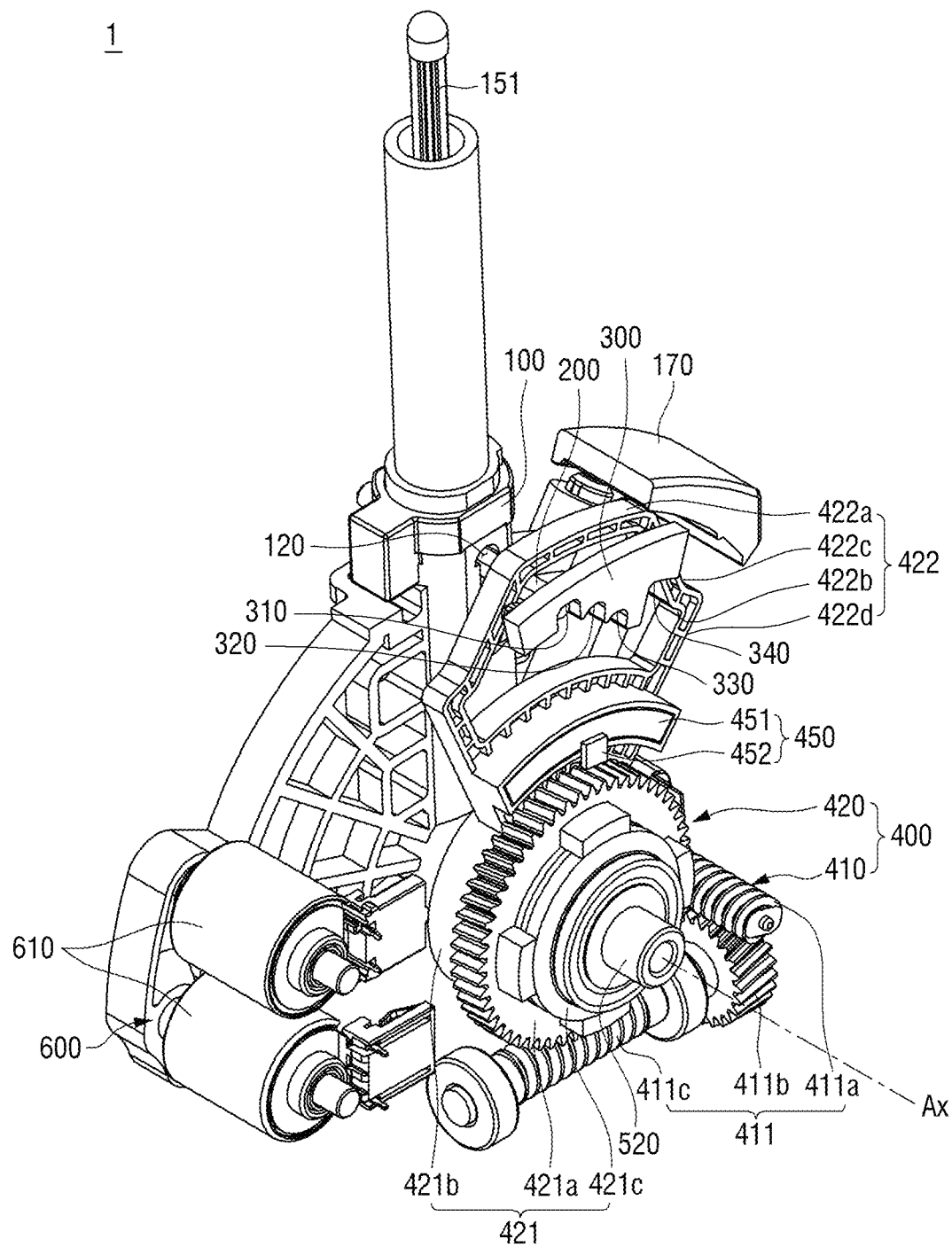
FIGS. 2 and 3 are perspective views showing a transmission for a vehicle according to an embodiment of the present disclosure.
Figure 3:
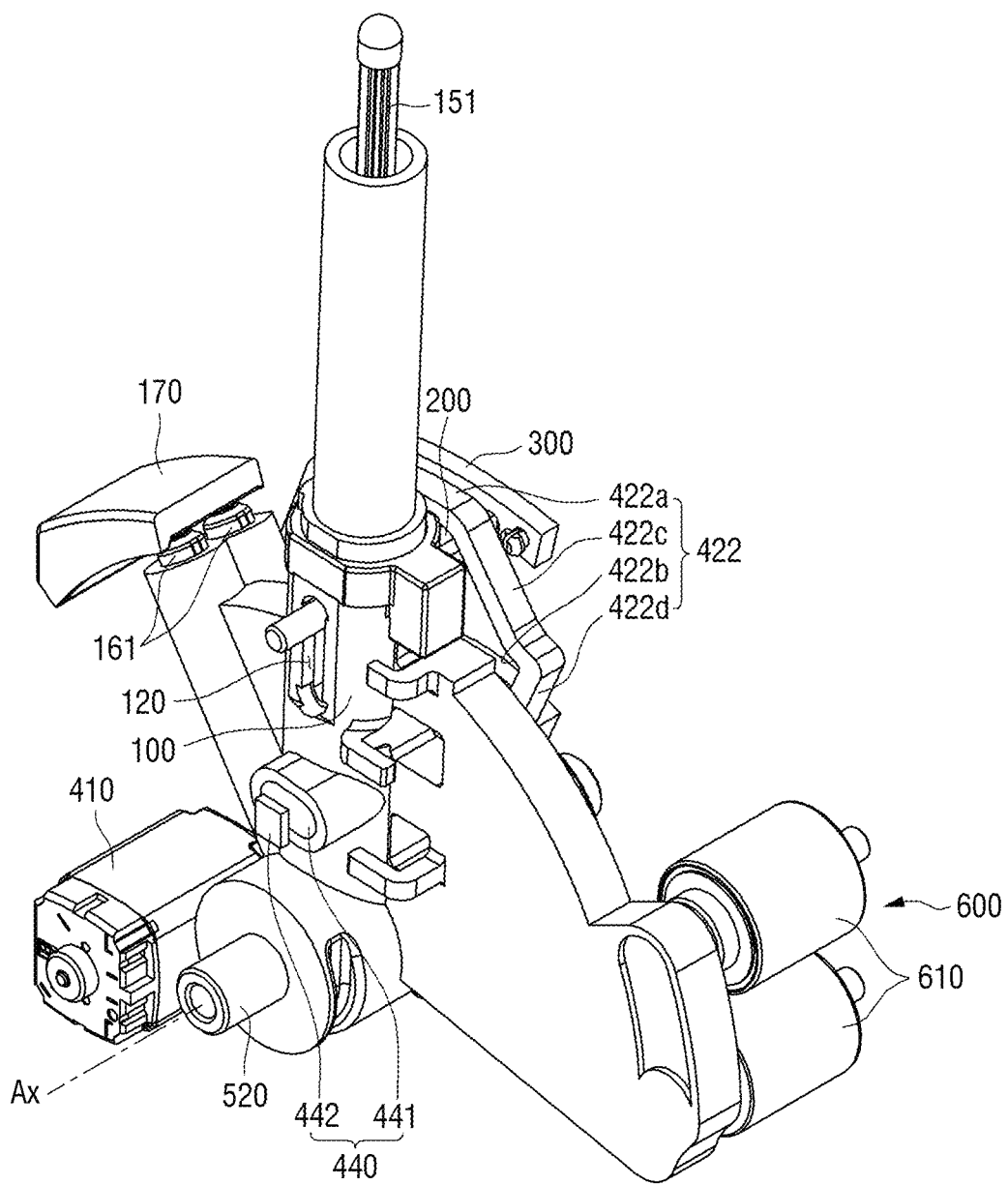
Figure 4:
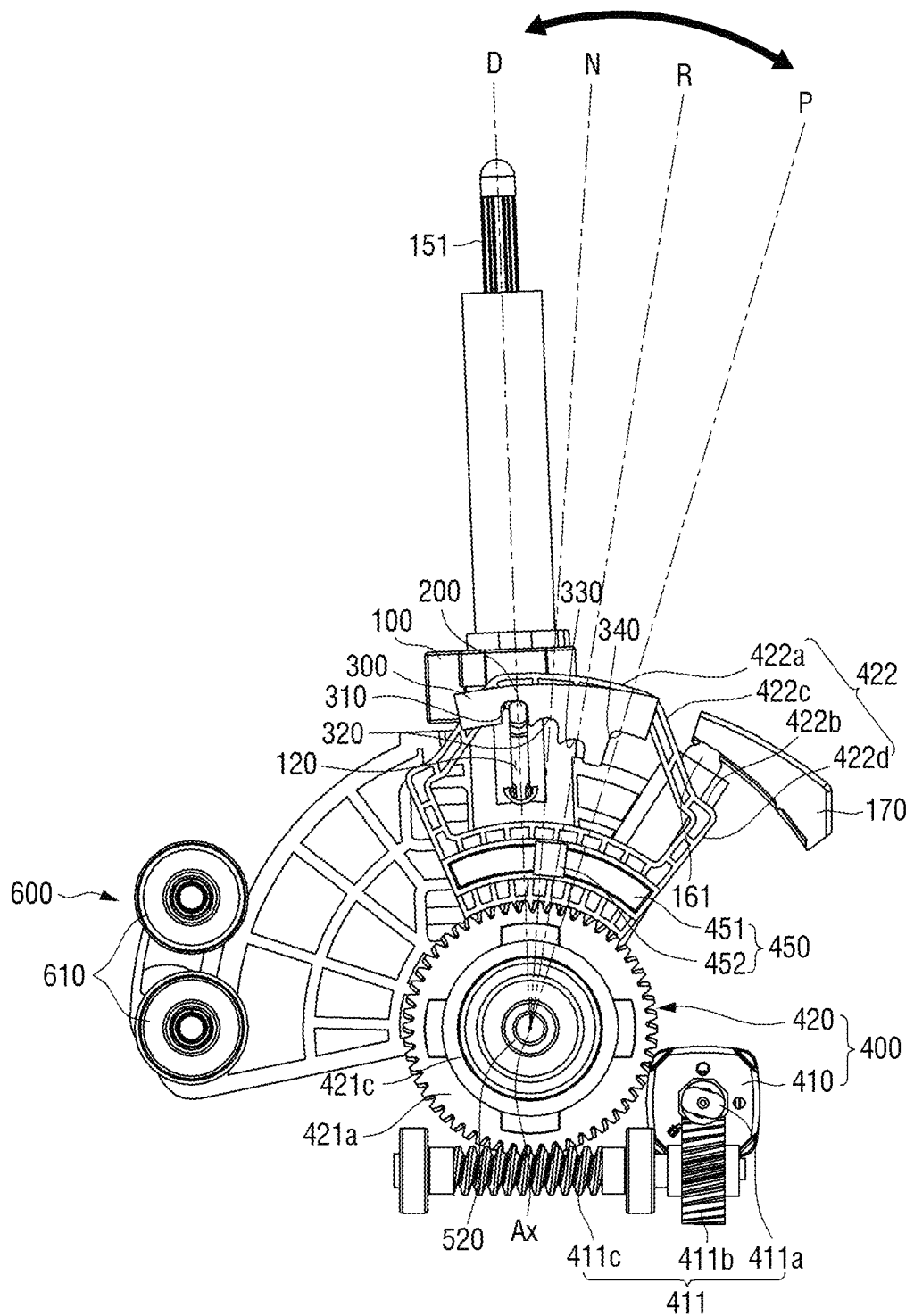
FIG. 4 is a side view showing transmission for a vehicle according to an embodiment of the present disclosure.

FIG. 1 is a perspective view showing an exterior appearance of a transmission for a vehicle according to an embodiment of the present disclosure. FIGS. 2 and 3 are perspective views showing a transmission for a vehicle according to an embodiment of the present disclosure. FIG. 4 is a side view showing a transmission for a vehicle according to an embodiment of the present disclosure. FIGS. 2 to 4 show a transmission for a vehicle according to an embodiment of the present disclosure with a transmission housing 500 removed for illustration purposes.

Referring to FIGS. 1 to 4, a transmission 1 for a vehicle according to an embodiment of the present disclosure may include a shift lever 100, a pawl member 200, a detent plate 300, and a shift controller 400.

In an embodiment of the present disclosure, an example in which the transmission 1 for the vehicle is used for a remote parking system, which searches for an available parking space using a sensor for detecting a vehicle state, such as a wheel sensor and a steering angle sensor, and a sensor for sensing a vehicle's surrounding state, such as an imaging sensor (e.g., a camera), a lidar sensor, a radar sensor, and an ultrasonic sensor, and allows the vehicle to autonomously perform a parking operation when a parking space is found, is described. However, the present disclosure is not limited thereto. The transmission 1 for the vehicle of the present disclosure may be used not only in the remote parking system, but also in various situations where the shift stage needs to be switched without the driver's shift manipulation, for example, where the shift stage automatically switches to a P shift stage during remote driving or when an engine of the vehicle is turned off.

When the transmission 1 for the vehicle of the present disclosure is used for the purpose of the remote parking system, the above-described vehicle state and the above-described surrounding state of the vehicle may be transmitted to an electronic control unit (ECU) of the vehicle. In this case, the ECU of the vehicle may be configured to generate a shift signal for moving the vehicle forward or backward, and to transmit the shift signal to the shift controller 400 to be described later below. The shift controller 400 may rotate the shift lever 100 based on the shift signal transmitted from the ECU of the vehicle so that the shift stage is switched.

The shift lever 100 may be disposed in the transmission housing 500 and may be rotatably installed around a rotation axis Ax so that the driver may select one of a plurality of shift stages. The driver may grab a knob (not shown) provided at a distal end of the shift lever 100 and may move the knob in a forward/backward direction, left/right direction, or a combination thereof such that the shift lever 100 may be rotated around the rotation axis Ax and thus a desired shift stage may be selected.

In an embodiment of the present disclosure, an example in which the shift stages selectable based on the rotation of the shift lever 100 include P, R, N, and D shift stages will be described. In this case, when the shift lever 100 is rotated in a first direction around the rotation axis Ax, the shift stage may be selected in an order of D, N, R, and P shift stages. When the shift lever 100 is rotated in a second direction opposite to the first direction, the shift stage may be selected in an order of P, R, N, and D shift stages.

In this regard, the shift stage that may be selected based on the rotation of the shift lever 100 is not limited to the above example. The shift stage that may be selected based on the rotation of the shift lever 100 may be variously modified. In some embodiments, one or more of the shift stages may be selected using a button or a switch provided separately.

Further, the transmission housing 500 may be provided with an indicator 510 in which a movement passage 511 for guiding movement of the shift lever 100 is formed. A display device (not shown) may be provided adjacent to the moving passage 511 to display a shift stage selectable by the shift lever 100 or a current shift stage.

Figure 5:
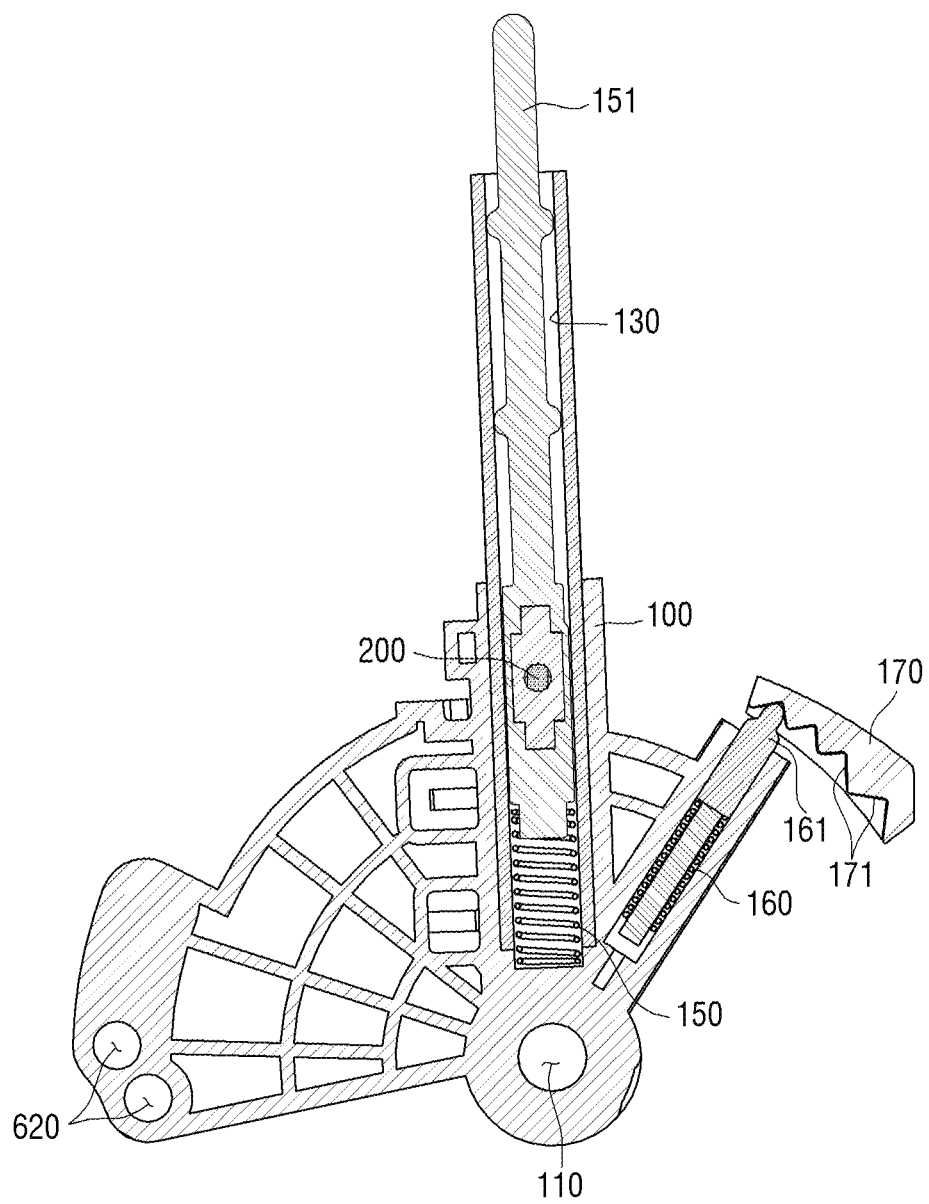
FIGS. 5 and 6 are cross-sectional views showing a shift lever according to an embodiment of the present disclosure.
Figure 6:
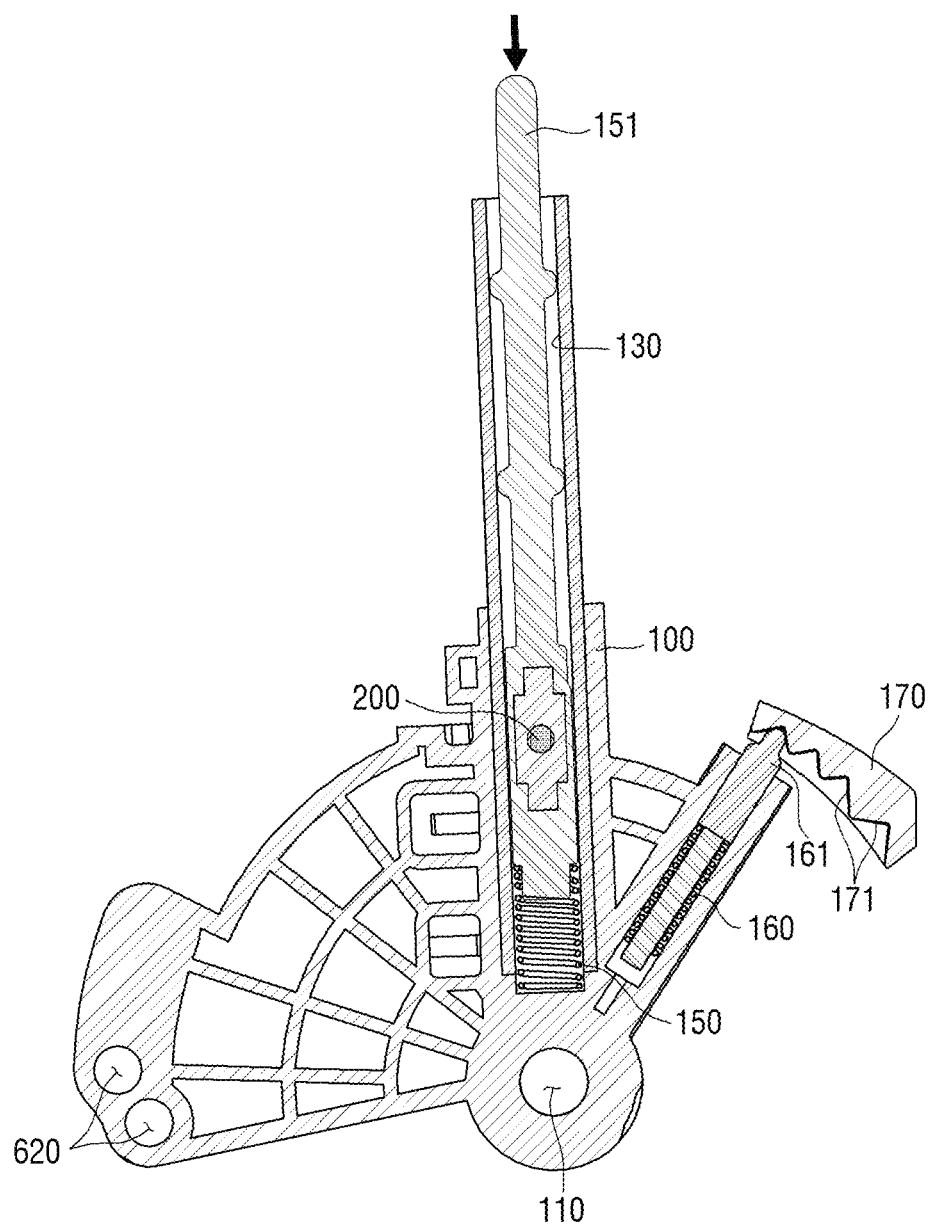

FIGS. 5 and 6 are cross-sectional views showing a shift lever according to an embodiment of the present disclosure. Referring to FIGS. 5 and 6, the shift lever 100 according to an embodiment of the present disclosure may include a through hole 110 defined therein, through which a central shaft 520 having the rotation axis Ax as a center thereof passes. Thus, the shift lever 100 may rotate around the rotation axis Ax.

The pawl member 200 may be installed in the shift lever 100 so as to be movable in a radial direction with respect to the rotation axis Ax of the shift lever 100. A movement hole 120 may be formed in the shift lever 100 so as to extend in a radial direction with respect to the rotation axis Ax so that a movement range of the pawl member 200 is limited. While the pawl member 200 is able to move in the radial direction to and from the rotation axis Ax due to the movement hole 120, the movement of the pawl member 200 in the rotational direction of the shift lever 100 may be prevented. Thus, when a force in the rotational direction of the shift lever 100 is applied to the pawl member 200, the shift lever 100 may rotate around the rotation axis Ax by the pawl member 200.

A proximal end of a shift rod 151 of the shift lever 100 which enables the movement of the pawl member 200 during the driver's shift manipulation may be inserted into a guide hole 130 of the shift lever 100. The proximal end of the shift rod 151 may be elastically supported by a first elastic member 150. Thus, when the driver applies a force to a distal end of the shift rod 151 for the shift manipulation, the first elastic member 150 may be compressed such that the pawl member 200 may move closer to the rotation axis Ax of the shift lever 100. When the force applied to the second end of the shift rod 151 from the driver is removed, the pawl member 200 may be returned to its original position due to a restoring force of the first elastic member 150.

In this regard, FIG. 5 shows an example where a position of the pawl member 200 is in a state that the driver applies no force to the shift rod 151. FIG. 6 shows an example where a position of the pawl member 200 is in a state that the driver applies a force to the shift rod 151. It may be identified that the position of the pawl member 200 of FIG. 6 is closer to the rotation axis Ax of the shift lever 100 than the position of the pawl member 200 of FIG. 5.

Further, a bullet 161 that is elastically supported by a second elastic member 160 may be disposed on one side of the shift lever 100. An end of the bullet 161 may be in contact with a detent groove 170 where a plurality of grooves 171 are formed along the rotation direction of the shift lever 100. Thus, when the shift lever 100 rotates, the end of the bullet 161 elastically supported by the second elastic member 160 may move to adjacent grooves while the contact thereof with the detent groove 170 is maintained. Thus, when the driver manipulates the shift lever 100, a manipulation feeling (e.g., a haptic feedback) may be provided to the driver.

In other words, the shift lever 100 may be rotated while the end of the bullet 161 elastically supported by the second elastic member 160 is in contact with the detent groove 170. Accordingly, as the second elastic member 160 is compressed or decompressed according to a profile shape of the plurality of grooves 171, the manipulation feeling may be provided to the driver.

In this regard, the detent groove 170 may be fixedly installed in the transmission housing 500, so that when the shift lever 100 rotates, the end of the bullet 161 may move between grooves adjacent to each other.

The detent plate 300 may be fixedly installed in the transmission housing 500 and may include a plurality of detent grooves 310, 320, 330, and 340 arranged along the rotation direction of the shift lever 100. The pawl member 200 may be inserted into and positioned in a detent groove corresponding to a current shift stage among the plurality of detent grooves 310, 320, 330, and 340.

In an embodiment of the present disclosure, the plurality of detent grooves 310, 320, 330, and 340 may include four detent grooves 310, 320, 330, and 340 since the shift stages selectable based on the rotation of the shift lever 100 are the four shift stages P, R, N, and D. However, the present disclosure is not limited thereto, and the number of the detent grooves formed in the detent plate 300 may vary according to the number of the shift stages selectable based on the rotation of the shift lever 100.

Each of the plurality of detent grooves 310, 320, 330, and 340 may be configured so that an opening thereof into which the pawl member 200 is to be inserted faces the rotation axis Ax of the shift lever 100. Accordingly, a state in which the pawl member 200 is inserted into one of the plurality of detent grooves 310, 320, 330, and 340 may be maintained due to the restoring force of the first elastic member 150 unless an external axial force is applied to the shift rod 151.

In this regard, the pawl member 200 being disposed so as to be inserted into one of the plurality of detent grooves 310, 320, 330, and 340 may be intended to prevent the shift lever 100 from rotating due to driver's mistake or unintended external impact. Thus, the rotation of the shift lever 100 may be restricted unless the driver applies an axial force to the shift rod 151 for the shift stage to be switched.

Figure 7:
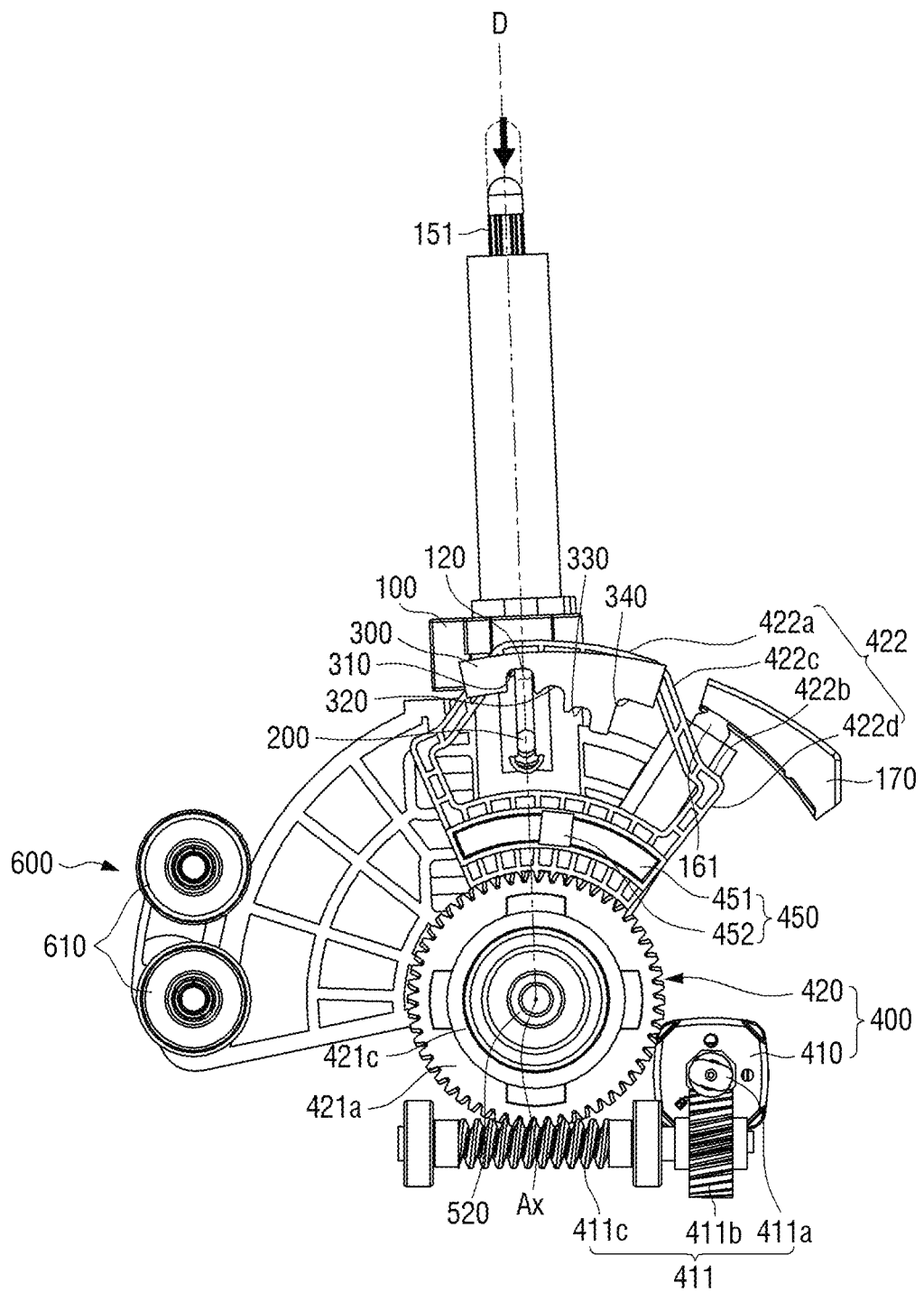
FIGS. 7 to 9 are side views illustrating a shift lever being rotated based on a driver's shift manipulation according to an embodiment of the present disclosure.
Figure 8:
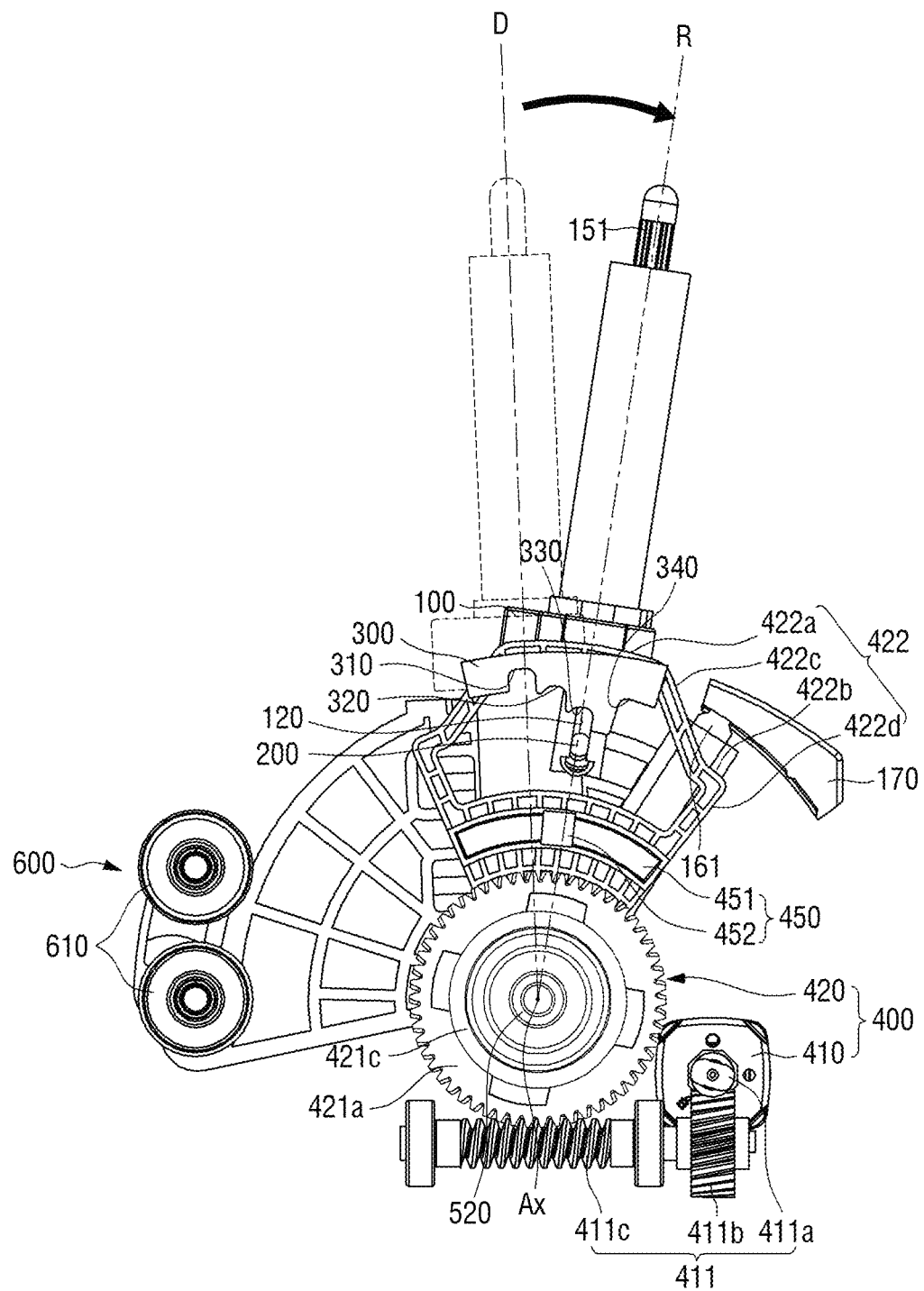

One of the plurality of detent grooves 310, 320, 330, and 340 may be formed at a different radial distance than an adjacent one. Due to such configuration, the pawl member 200 may prevent the shift lever 100 from being inadvertently rotated due to the driver's mistake or unintended external impact. As shown in FIG. 7, the driver may apply the force to the distal end of the shift rod 151 so that the pawl member 200 moves to a position, at which a distance between the pawl member 200 and the rotation axis Ax is smaller than a distance between the rotation axis Ax and the detent groove that is closest to the rotation axis Ax among the plurality of detent grooves 310, 320, 330, and 340. As shown in FIG. 8, a desired shift stage may be selected by the driver by rotating the shift lever 100. In this state, the force applied to the shift rod 151 from the driver may be removed such that, as shown in FIG. 9, the pawl member 200 is inserted into and disposed in a detent groove that corresponds to a currently selected shift stage among the plurality of detent grooves 310, 320, 330, and 340, due to the restoring force of the first elastic member 150.

Figure 9:
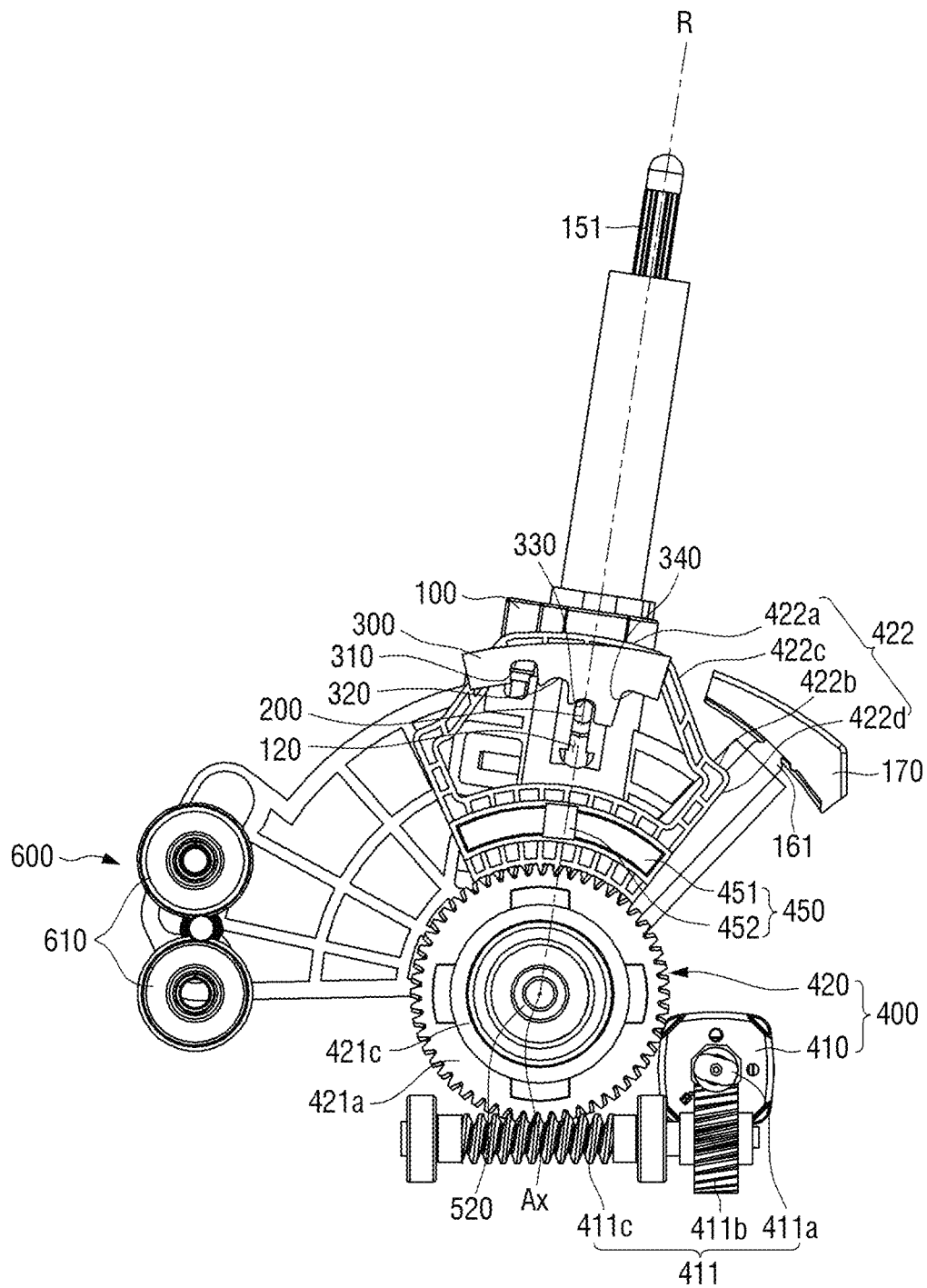

In this regard, FIGS. 7 to 9 are examples of a case in which the driver shifts from the D stage to the R stage. However, the present disclosure is not limited thereto. When the driver shifts from one of the aforementioned plurality of shift stages to another, the shifting may be performed in a manner similar to that of FIGS. 7 to 9 as described above.

Accordingly, due to the restoring force of the first elastic member 150, the pawl member 200 may be maintained at a position at which the pawl member is inserted into one of the plurality of detent grooves 310, 320, 330, and 340 until an external axial force is applied to the shift rod 151. Thus, the rotation of the shift lever 100 due to driver's mistake or unintended external impact may be prevented. On the other hand, when the external force is applied to the shift rod 151, the pawl member 200 may be dislodged from the plurality of detent grooves 310, 320, 330, and 340. Thus, the shift lever 100 may be rotated as the pawl member 200 moves to a position at which a distance between the pawl member 200 and the rotation axis Ax is smaller than a distance between the rotation axis Ax and the respective detent groove among the plurality of detent grooves 310, 320, 330, and 340.

In a system such as the aforementioned remote parking system, the shift controller 400 may be configured to switch the shift stage according to a shift signal transmitted from the ECU of the vehicle, without a driver's shift manipulation.

Figure 10:
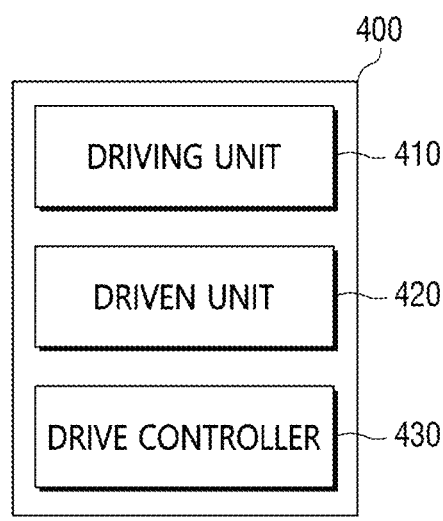
FIG. 10 is a block diagram showing a shift controller according to an embodiment of the present disclosure.
Figure 11:
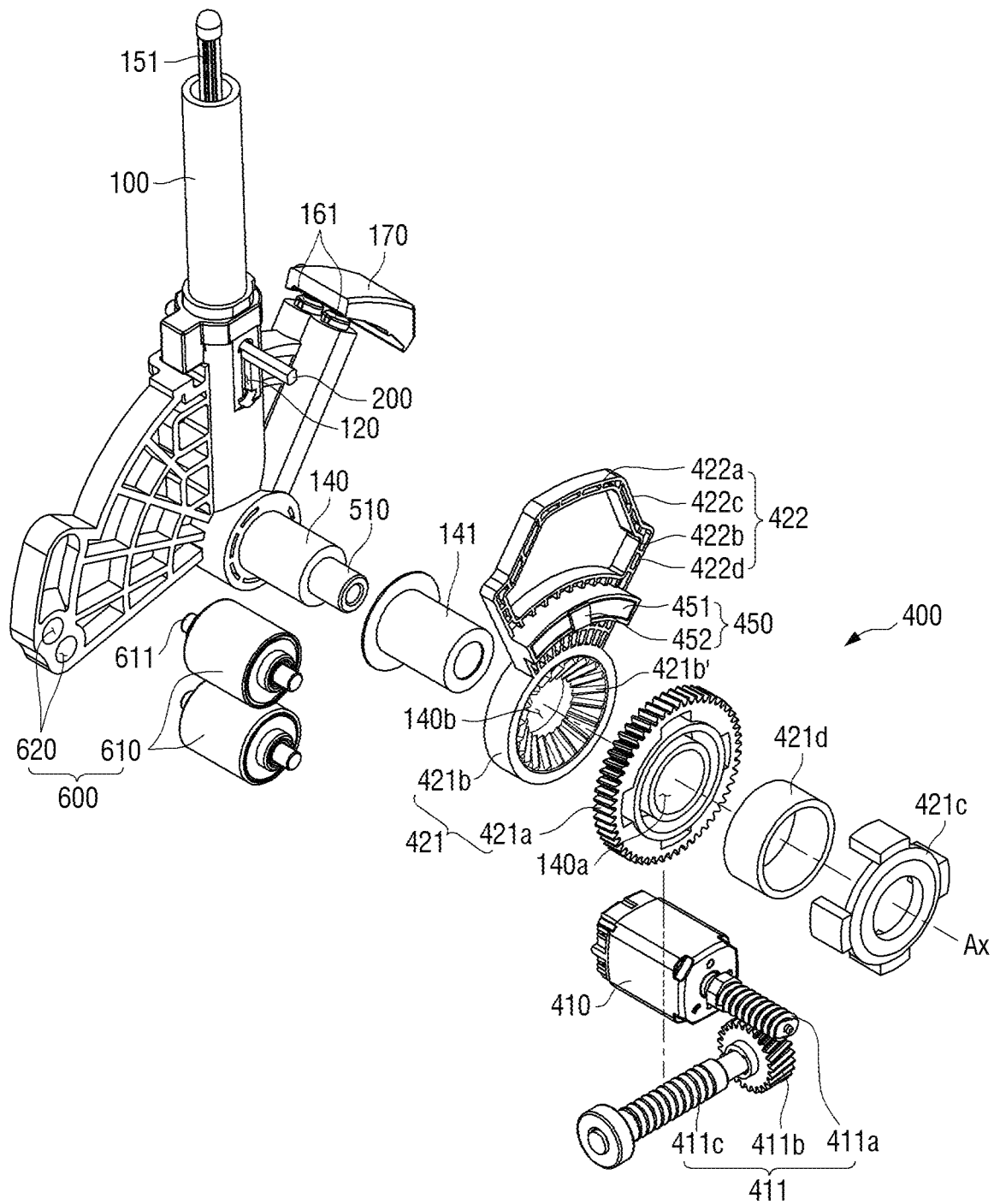
FIGS. 11 and 12 are exploded perspective views showing a driving unit and a driven unit according to an embodiment of the present disclosure.
Figure 12:
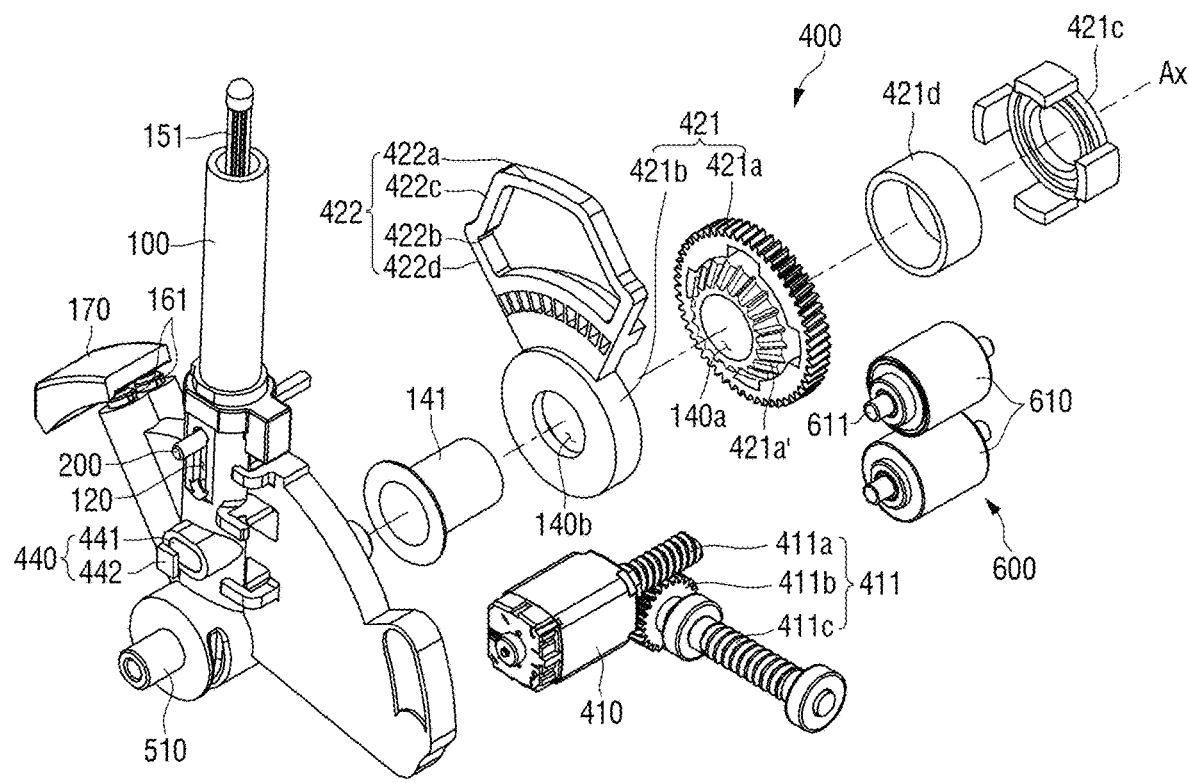
Figure 13:
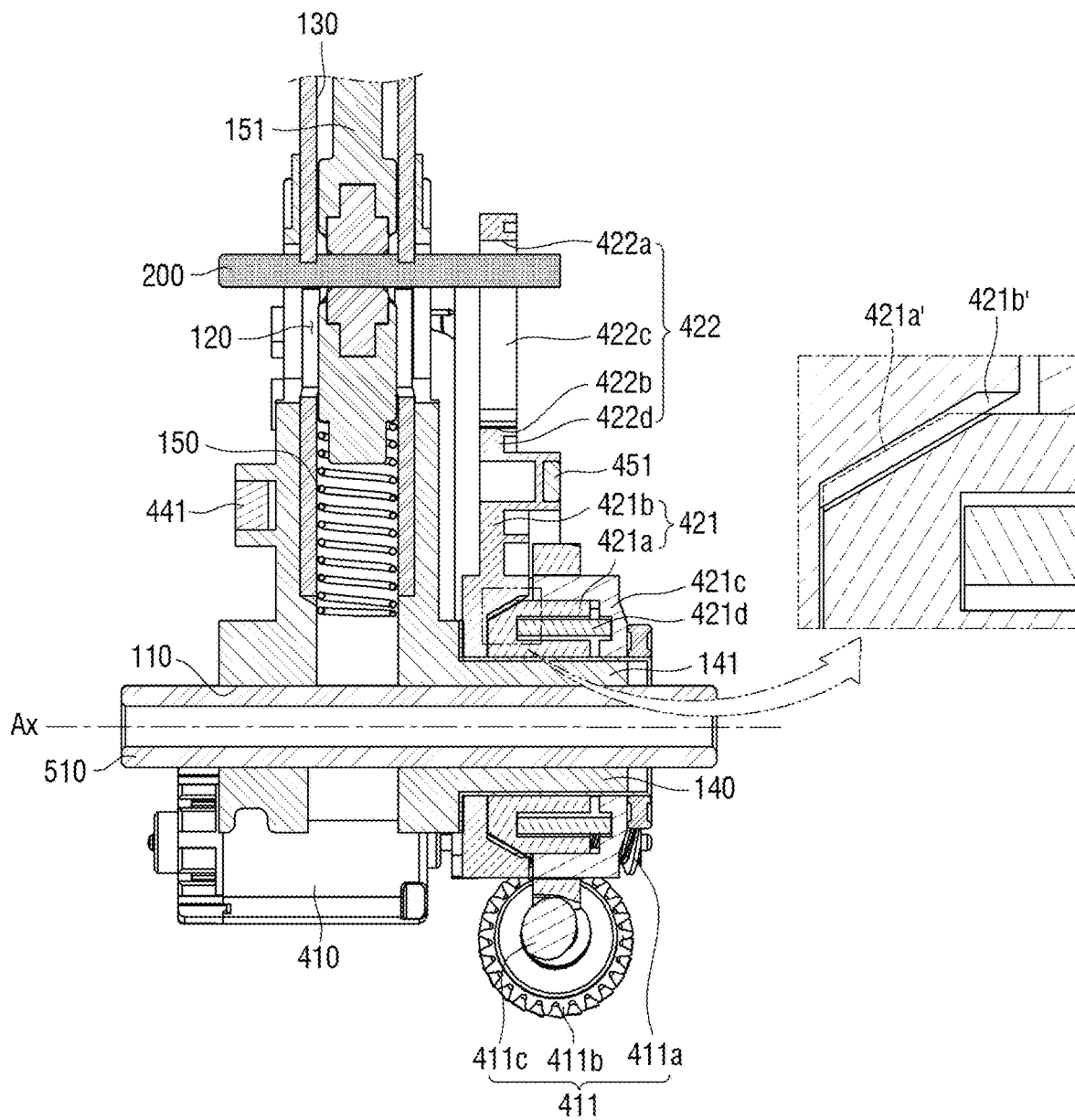
FIG. 13 is a cross-sectional view showing a driving unit and a driven unit according to an embodiment of the present disclosure.

FIG. 10 is a block diagram showing a shift controller according to an embodiment of the present disclosure. FIGS. 11 and 12 are exploded perspective views showing a driving unit and a driven unit according to an embodiment of the present disclosure. FIG. 13 is a cross-sectional view showing a driving unit and a driven unit according to an embodiment of the present disclosure.

Referring to FIGS. 10 to 13, the shift controller 400 according to an embodiment of the present disclosure may include a driving unit 410, a driven unit 420, and a drive controller 430.

The driving unit 410 may generate a driving force based on the shift signal received from the ECU of the vehicle. The driving force of the driving unit 410 may be transmitted to the driven unit 420 via a driving force transfer member 411, which includes at least one transfer gear 411*a*, 411*b*, and 411*c*, such that the driven unit 420 may be rotated around the rotation axis Ax of the shift lever 100.

The driven unit 420 may rotate around the rotation axis Ax of the shift lever 100 due to the driving force transmitted from the driving unit 410 so that the pawl member 200 may move both radially with respect to the rotation axis Ax of the shift lever 100 as well as circumferentially (e.g., along the rotational direction of the shift lever 100), thereby allowing the shift lever 100 to be rotated around the rotation axis Ax.

The driven unit 420 may be mounted on a mount 140 formed to extend along the rotation axis Ax from one side of the through hole 110 formed in the shift lever 100, and may be rotated around the rotation axis Ax of the shift lever 100 with the driving force of the driving unit 410. The driven unit 420 may include a gear unit 421 and a shift guide 422.

The gear unit 421 may include an input gear 421*a* to which the driving force of the driving unit 410 is input via the driving force transfer member 411, and an output gear 421*b* rotated by the driving force input to the input gear 421*a*.

The input gear 421*a* and the output gear 421*b* may be arranged along the direction of the rotation axis Ax so as to rotate around the rotation axis Ax of the shift lever 100. Gear teeth 421a' of the input gear 421a and gear teeth 421b' of the output gear 421b may be disposed so as to be engaged with each other so that the output gear 421b may be rotated when the input gear 421a rotates.

The input gear 421a and the output gear 421b may respectively have hollow spaces 140a and 140b into which the above-described mount 140 of the shift lever 100 is inserted and disposed. The mount 140 may be provided with a bushing member 141 that facilitates smooth rotation of the input gear 421a and the output gear 421b and reduces a wear.

A gear cover 421c may be coupled to the input gear 421a. A pressing member 421d that is elastically deformed to be compressed or decompressed based on a position of the input gear 421a may be disposed between the input gear 421a and the gear cover 421c.

In this regard, a position of the gear cover 421c may be fixed by the transmission housing 500, or the like. Thus, a state in which the input gear 421a is engaged with the output gear 421b may be maintained due to a pressure applied by the elastic force of the pressing member 421d. Thus, when the driving force is input to the input gear 421a, the output gear 421b may be rotated together with the input gear 421a.

In this regard, the input gear 421a and the output gear 421b being engaged with each other via the elastic force applied by the pressing member 421d may be intended such that, during the shift stage switch process using the shift controller 400, when an external force in the opposite direction to the rotation direction of the input gear 421a is applied to the output gear 421b by the driver via the shift lever 100, or when an external force acting in the rotational direction of the input gear 421a and being greater than the driving force transmitted from the input gear 421a is applied to the output gear 421b, the pressing member 421d may be elastically deformed so that the gear teeth 421a' of the input gear 421a and the gear teeth 421b' of the output gear 421b meshed with each other may slide over each other, such that a gear slip may occur between the input gear 421a and the output gear 421b, thereby enabling relative movement between the input gear 421a and the output gear 421b and thus preventing damage to or failure of the gear unit 421.

Figure 14:
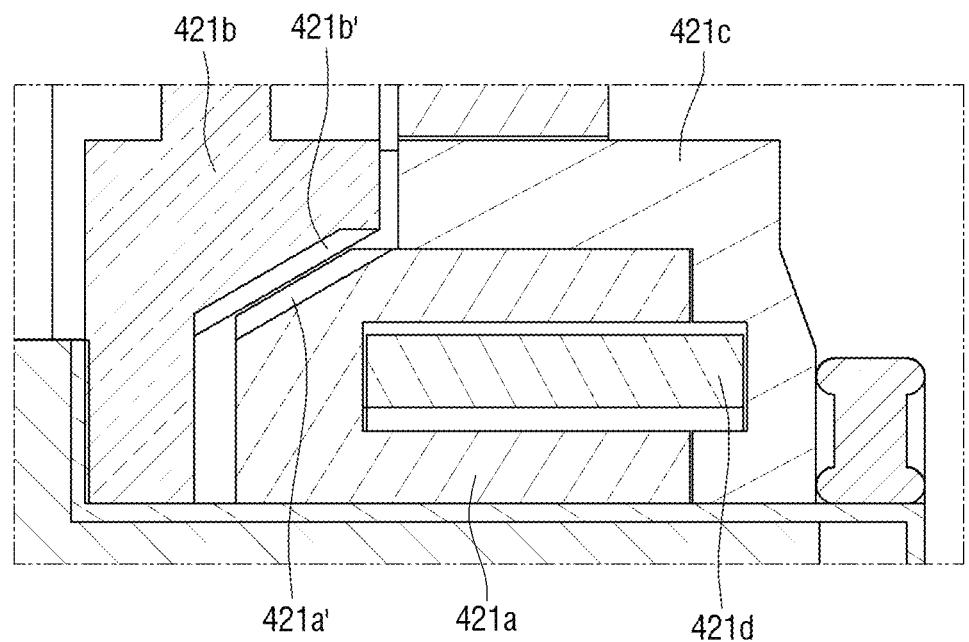
FIG. 14 is a cross-sectional view showing an input gear moving in a direction of a rotation axis of a shift lever according to an embodiment of the present disclosure.

In other words, the input gear 421a and the gear cover 421c may be disposed so as to be spaced apart from each other by a predetermined spacing when the pressing member 421d is elastically deformed. Due to this spacing, the input gear 421a may move toward the rotation axis Ax as shown in FIG. 14. Thus, the gear teeth 421a' of the input gear 421a and the gear teeth 421b' of the output gear 421b may slip, such that the gear teeth 421a' of the input gear 421a and the gear teeth 421b' of 421b may be disengaged from each other. Thus, the relative movement between the input gear 421a and the output gear 421b may be allowed.

As described above, when the external force is applied to the output gear 421b such that the gear slip phenomenon occurs between the input gear 421a and the output gear 421b, vibration and/or noise may be generated as the gear teeth 421a' of the input gear 421a and the gear teeth 421b' of the output gear 421b slip. As a result, the driver may recognize that the process of switching the shift stage is being performed by the shift controller 400, and thus, may recognize that the gear slip phenomenon is occurring due to the external force applied to the shift lever 100. Accordingly, the driver may react appropriately.

The shift guide 422 may be formed so that both opposing ends thereof are connected to different positions of the output gear 421b. Thus, the shift guide 422 together with the output gear 421b may define a closed curve shape.

In this regard, in an embodiment of the present disclosure, a combination of the shift guide 422 and the output gear 421b defining the closed curve shape may be intended such that when a force from the shift guide 422 is applied to the pawl member 200, deformation of the shift guide 422 may be prevented, and thus the force therefrom may be properly applied to the pawl member 200. However, the present disclosure is not limited to such a closed loop configuration, and when the deformation of the shift guide 422 is not a concern (depending on the material or other factors), the shift guide 422 may formed to include a disconnected portion.

The shift guide 422 may include a first guide 422a and a second guide 422b. A distance between the first guide 422a and the rotation axis Ax of the shift lever 100 may be equal to or greater than a distance between each of the plurality of detent grooves 310, 320, 330, and 340 and the rotation axis Ax of the shift lever 100. A distance between the second guide 422b and the rotation axis Ax of the shift lever 100 may be equal to or smaller than a distance between each of the plurality of detent grooves 310, 320, 330, and 340 and the rotation axis Ax of the shift lever 100. The second guide 422b may be disposed on both opposing ends of the first guide 422a in the rotational direction of the shift lever 100 and may be connected to the first guide 422a via a connector 422c.

The connector 422c may be configured such that a proximal end thereof that is connected to a distal end of the second guide 422b is farther away from the first guide 422a than a distal end thereof that is connected to the first guide 422a. This inclined configuration allows the pawl member 200 to move from one of the first guide 422a or the second guide 422b to the other thereof along a contact surface formed on the connector 422c.

In other words, if both opposing ends of the connector 422c are arranged in a linear manner along a radial direction with respect to the rotation axis Ax, it may be difficult for the pawl member 200 to move between the first guide 422a and the second guide 422b. For this reason, the connector 422c may be disposed inclinedly such that the connector 422c may radially guide the pawl member 200 toward the rotation axis Ax as the shift guide 422 is rotated in one direction, and may radially guide the pawl member 200 away from the rotation axis Ax as the shift guide 422 is rotated in the other direction.

A proximal end of the second guide 422b may be connected to an extension 422d that extends outward from the output gear 421b. Thus, when the output gear 422b rotates, the shift guide 422 connected to the output gear 421b may be rotated as well.

The first guide 422a may be sized such that the plurality of detent grooves 310, 320, 330, and 340 are disposed between both opposing ends thereof in the rotation direction of the shift lever 100. The shift guide 422 may have an initial position at which the plurality of detent grooves 310, 320, 330, and 340 are disposed between both opposing ends of the first guide 422a to enable the driver's shift manipulation in a general vehicle driving situation.

In this regard, when the shift signal is transmitted from the ECU of the vehicle to the shift controller 400 to cause the driving unit 410 to generate the driving force, the shift guide 422 may rotate in one of both opposing rotation directions around the rotation axis Ax of the shift lever 100 due to the rotation of the gear unit 421. In this case, the pawl member 200 may be pushed from the first guide 422a toward the second guide 422b along the contact surface of the connector 422c.

Further, the second guide 422b may be formed so as to extend from the proximal end of the connector 422c along the rotational direction of the shift lever 100. Thus, when the gear unit 421 continues to be rotated in the same direction, the second guide 422b may prevent the pawl member 200 from moving away in a radial direction from the rotation axis Ax of the shift lever 100.

In a state in which the pawl member 200 is disposed at the second guide 422b, the pawl member may receive a force in the rotational direction of the shift guide 422 from the extension 422d connected to and disposed between the output gear 421b and the second guide 422b. Since a relative rotation of the pawl member 200 with respect to the shift lever 100 is restricted due to the movement hole 130, the shift lever 100 may be rotated in the same direction as the rotation direction of the shift guide 422 via the pawl member 200 which is rotated by the shift guide 422.

For example, when the shift guide 422 is rotated in the first direction, the pawl member 200 may receive the force in the first direction from the extension 422d, such that the shift lever 100 rotates in the first direction.

In this regard, when the shift lever 100 is rotated to a position corresponding to a target shift stage due to the rotation of the shift guide 422, the driving unit 410 may generate a driving force to rotate the shift guide 422 in a second direction, which is opposite to the first direction. Accordingly, the pawl member 200 may move from the second guide 422b toward the first guide 422a along the connector 422b due to the restoring force of the first elastic member 150, so that the pawl member 200 may be inserted into a detent groove that corresponds to the target shift stage among the plurality of detent grooves 310, 320, 330, and 340.

The drive controller 430 may be configured to control the driving unit 410 based on the shift signal transmitted from the ECU of the vehicle so that the shift guide 422 rotates in one of the first direction or the second direction.

The drive controller 430 may be configured to control the driving unit 410 based on a detecting result of a first position sensing unit 440 to detect a position of the shift lever 100 and a detecting result of a second position sensing unit 450 to detect a position of the shift guide 422.

The first position sensing unit 440 may include a first magnet 441 mounted on the shift lever 100 and a first sensor 442 that detects a magnetic force from the first magnet 441. The second position sensing unit 450 may include a second magnet 451 mounted on the shift guide 422 and a second sensor 452 that detects a magnetic force from the second magnet 451. By way of example, each of the first sensor 442 and the second sensor 452 may be implemented with a Hall sensor.

The drive controller 430 may be configured to determine whether the shift lever 100 has reached a position corresponding to the target shift stage, based on the detection result of the first position sensing unit 440, and may detect the position of the shift guide 422 based on the detection result of the second position sensing unit 450. The drive controller 430 may be configured to control the driving unit 410 so that the shift guide 422 returns to the initial position to allow the driver to perform shift manipulation after the shift lever 100 reaches the position corresponding to the target shift stage.

In this regard, the drive controller 430 may be configured to generate a shift control signal corresponding to a shift stage based on the position of the shift lever 100 detected by the first position sensing unit 440, and to transmit the generated shift control signal to the transmission such that the shift stage may be shifted based on the shift control signal.

In an embodiment of the present disclosure, a case where the shift controller 400 includes the drive controller 430 is described by way of example. However, the present disclosure is not limited thereto. The ECU of the vehicle may serve as the drive controller 430. In this case, a separate drive controller 430 may be omitted.

In an example, the transmission 1 for the vehicle according to the present disclosure may further include a shift lock unit 600 that enables and disables shifting from a current shift stage to another shift stage depending on whether one or more shift conditions are satisfied. In an embodiment of the present disclosure, the shift lock unit 600 may include at least one actuator 610, such as a solenoid, including a movable rod 611 that is linearly movable, and at least one receiving groove 620 formed in the shift lever 100 into which an end of the movable rod 611 may be inserted.

In this regard, in an embodiment of the present disclosure, a case in which the shift lock unit 600 includes a plurality of actuators 610 will be described by way of example. This is intended such that a shift lock function is implemented on two or more different shift stages. The present disclosure is not limited thereto, however. The number of the actuators 610 may be varied according to the numbers of the shift stages on which the shift locking function is required.

The shift lock unit 600 may enable the shift lock function to be activated when the end of the movable rod 611 is inserted into the insertion groove 620. When a shift condition such as a predetermined vehicle speed or whether a brake pedal is pressed is satisfied, the actuator 610 may operate to allow the end of the movable rod 611 to be disengaged from the insertion groove 620, and thus the shift lever 100 may be rotated by the driver or the shift controller 400.

A process in which the above-mentioned shift controller 400 switches the shift stage will be described with reference to FIGS. 13 to 16. FIGS. 13 to 16 are directed to an example of a case in which the shift lever 100 is rotated from a position corresponding to the D shift stage to a position corresponding to the R shift stage by the shift controller 400.

Figure 15:
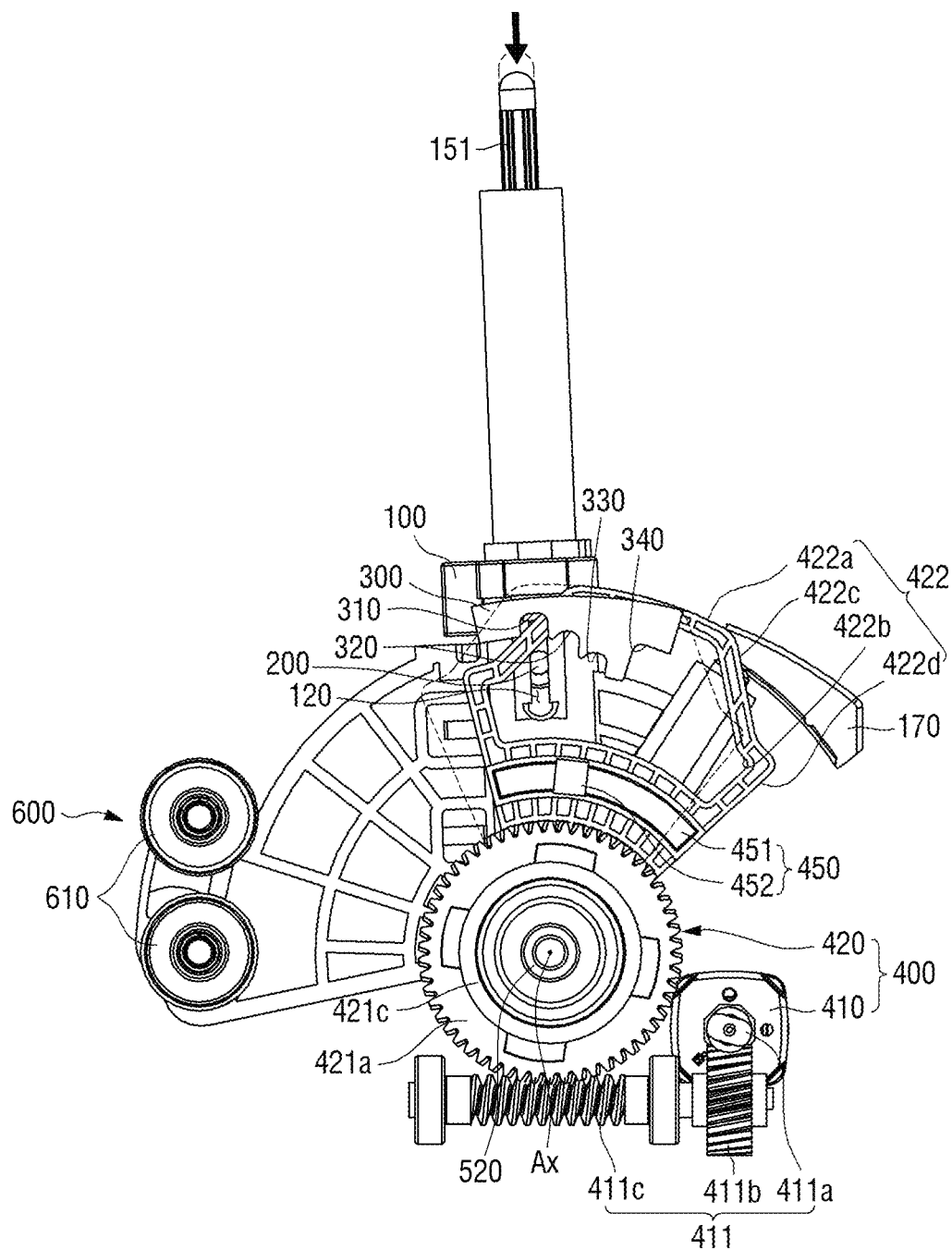
FIGS. 15 to 18 are side views showing a shift lever being rotated by a shift controller according to an embodiment of the present disclosure.
Figure 16:
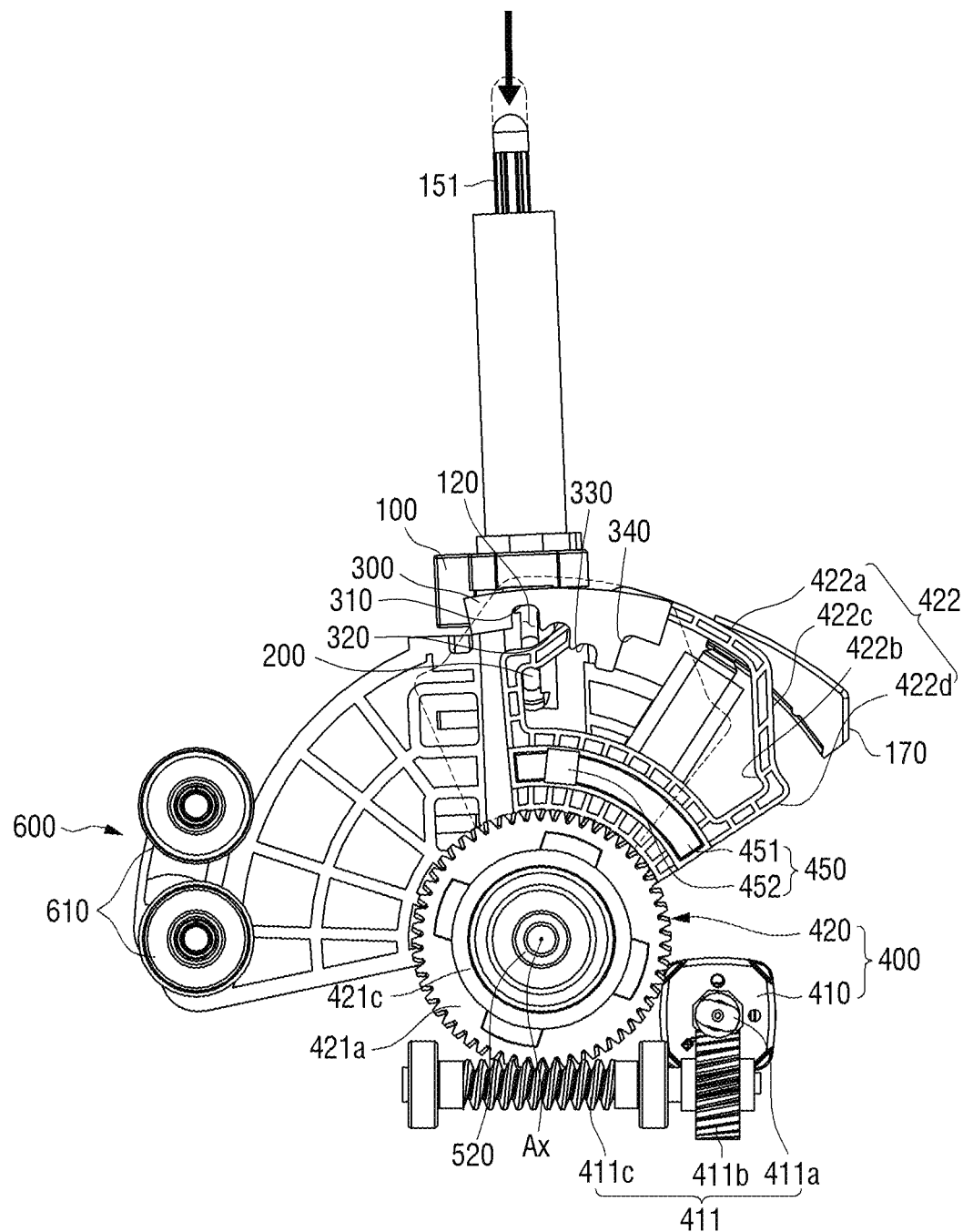

When a shift signal that instructs a shift operation to the R shift stage is transmitted to the drive controller 430 in a state where the shift lever 100 is disposed at the D shift stage, the drive controller 430 may cause the driving unit 410 to rotate the shift guide 422 in the first direction (e.g., the clockwise direction as shown in FIG. 15). In this case, as shown in FIG. 15, the pawl member 200 may move from the first guide 422a toward the second guide 422b along the contact surface of the connector 422c such that the pawl member 200 may be disposed at the second guide 422b as shown in FIG. 16.

Figure 17:
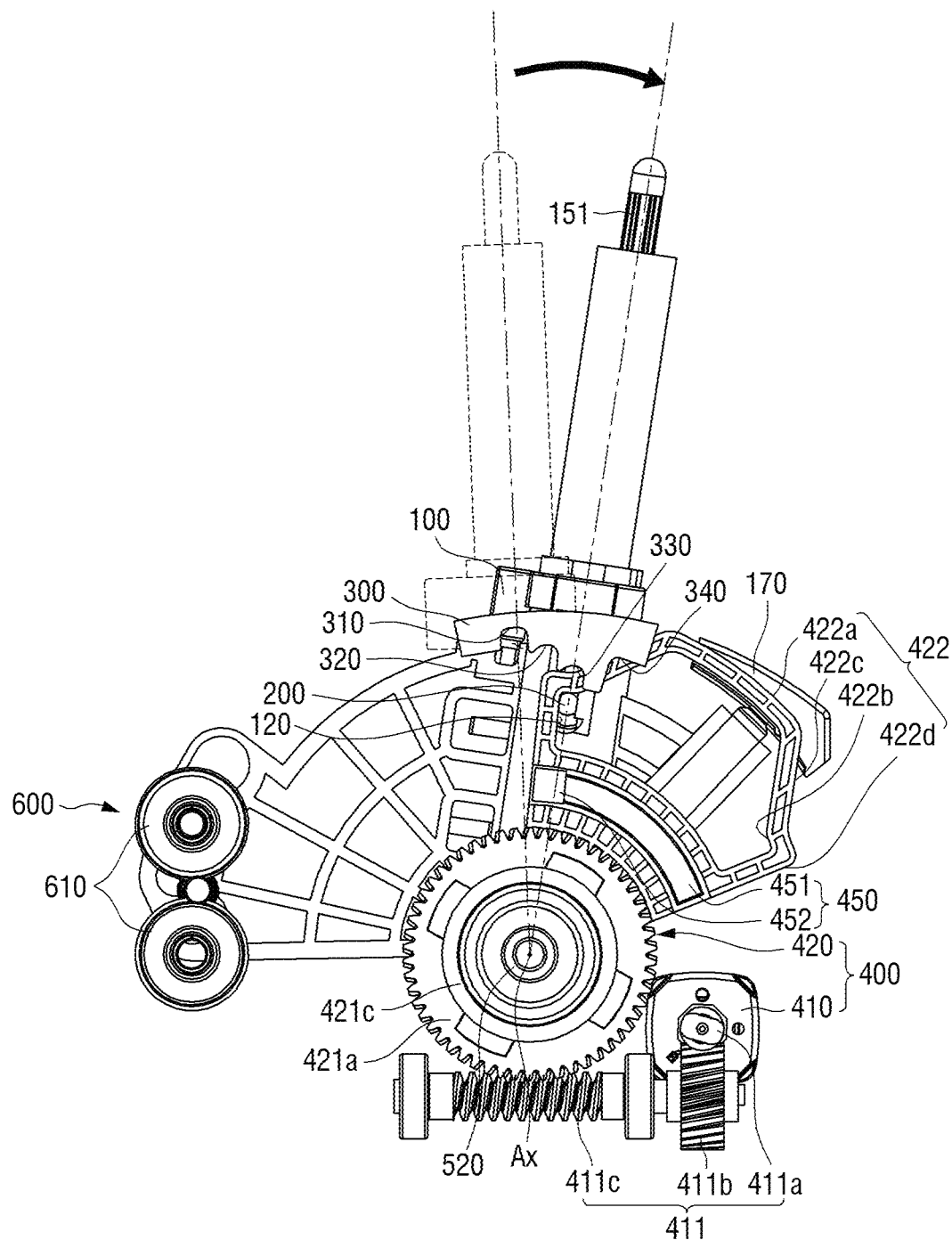

When the pawl member 200 is disposed at the second guide 422b, since the distance between the rotation axis Ax and the pawl member 200 is smaller than a distance between the rotation axis Ax and each of the plurality of detent grooves 310, 320, 330, and 340, the restraint of the rotation of the shift lever 100 by the pawl member 200 may be released. When the shift guide 422 is continuously rotated in the first direction, the extension 422d may exert the force in the first direction to the pawl member 200 as shown in FIG. 17 so that the shift lever 100 may be rotated to a position corresponding to the R shift stage.

Figure 18:
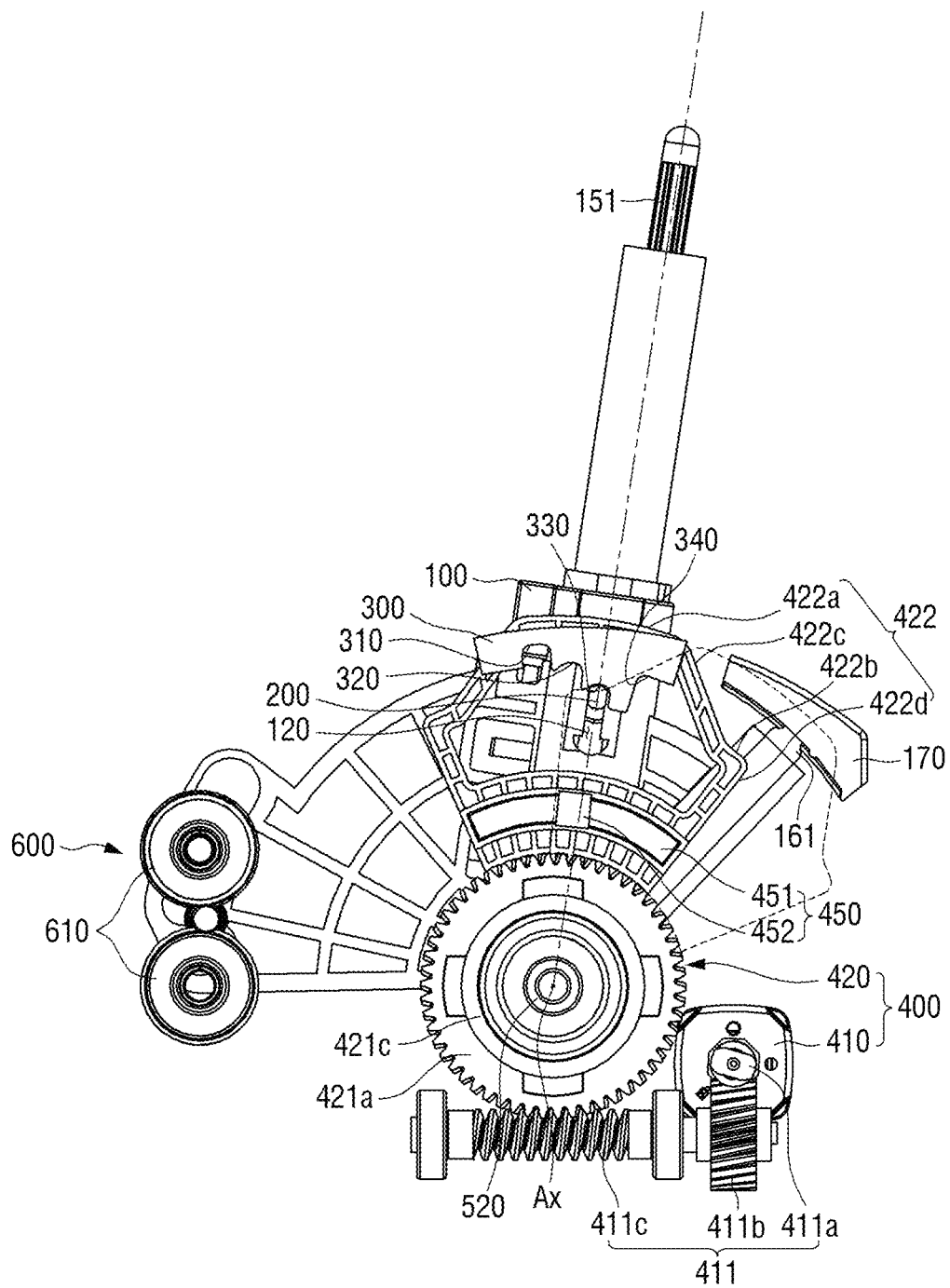

When the shift lever 100 has been rotated to the position corresponding to the R shift stage, the drive controller 430 may cause the driving unit 410 to rotate the shift guide 422 in the second direction (e.g., the counter-clockwise direction as shown in FIG. 18). In this case, the pawl member 200 may move from the second guide 422b toward the first guide 422a along the contact surface of the connector 422c due to the restoring force of the first elastic member 150. Thus, as shown in FIG. 18, the pawl member 200 may be inserted into a detent groove corresponding to the R shift stage among the plurality of detent grooves 310, 320, 330, and 340 such that the rotation of the shift lever 100 may be restricted again.

In the above-mentioned FIG. 15 to FIG. 18, a case where the shift stage is switched from the D shift stage to the R shift stage has been described by way of example. However, the present disclosure is not limited thereto. The description may be similarly applied to a case when the shift stage is switched from any one of the plurality of shift stages to another shift stage.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A transmission for a vehicle, comprising:
a shift lever rotatable around a rotation axis, thereby allowing one of a plurality of shift stages to be selected;
a pawl member disposed in the shift lever so as to be movable in a radial direction with respect to the rotation axis;
a detent plate including a plurality of detent grooves formed therein and arranged along a rotational direction of the shift lever so that the pawl member is capable of being inserted into each of the plurality of detent grooves corresponding to each of the plurality of shift stages; and
a shift lever actuator that rotates the shift lever to allow a shift stage to be shifted from one of the plurality of shift stages to another of the plurality of shift stages, based on a shift signal,
wherein the shift lever actuator includes:
a driving unit; and
a driven unit that is rotated about the rotation axis by a driving force transmitted from the driving unit to cause the pawl member to move in the radial direction with respect to the rotation axis, and to apply a force to the pawl member in the rotation direction of the shift lever to rotate the shift lever,
wherein the driven unit includes:
a gear unit that is rotated by the driving force of the driver; and
a shift guide that is rotated with the gear unit to cause the shift lever to be rotated, and
wherein the shift guide includes:
a first guide disposed such that a distance between the rotation axis and the first guide is equal to or greater than a distance between the rotation axis and each of the plurality of detent grooves;
a second guide formed at one side of the first guide in a rotation direction of the shift lever, wherein the second guide is disposed such that a distance between the rotation axis and the second guide is equal to or smaller than a distance between the rotation axis and each of the plurality of detent grooves;

a connector connected to and disposed between the first guide and the second guide; and
an extension that extends from the output gear and is connected to the second guide.

2. The transmission of claim 1, wherein the shift lever includes an elastic member that elastically supports the pawl member in the radial direction with respect to the rotation axis.

3. The transmission of claim 1, wherein each of the plurality of detent grooves includes an opening into which the pawl member is configured to be inserted, wherein the opening faces the rotation axis.

4. The transmission of claim 1, wherein the shift lever actuator allows the pawl member to move closer to the rotation axis so that the pawl member is dislodged from a detent groove corresponding to a current shift stage among the plurality of detent grooves, thereby permitting the shift lever to rotate, and
wherein, in response to the shift lever having been rotated to a position corresponding to a target shift stage, the shift lever actuator allows the pawl member to move away from the rotation axis so that the pawl member is inserted into a detent groove corresponding to the target shift stage among the plurality of detent grooves.

5. The transmission of claim 1, further comprising a position sensor unit for detecting a position of the shift lever,
wherein a shift stage among the plurality of shift stages is determined based on the position of the shift lever detected by the position sensor unit, and
wherein the position sensor unit includes a magnet mounted on the shift lever, and a magnetic sensor for detecting a magnetic force transmitted from the magnet.

6. The transmission of claim 1, wherein the shift lever includes a movement hole defined therein for guiding a movement of the pawl member, and
wherein the movement hole extends in the radial direction with respect to the rotation axis so as to allow the pawl member to move in the radial direction with respect to the rotation axis, and to prevent the pawl member from moving in the rotation direction of the shift lever relative to the shift lever.

7. The transmission of claim 1, wherein the shift lever actuator includes a driving force transfer member for transmitting the driving force to the driven unit, and
wherein the driving force transfer member includes at least one transfer gear.

8. The transmission of claim 1, wherein the gear unit includes:
an input gear that is rotated around the rotation axis by the driving force generated from the driving unit;
an output gear to which the shift guide is connected, wherein the output gear includes gear teeth configured to be engaged with gear teeth of the input gear, allowing the output gear to be rotated about the rotation axis with the rotation of the input gear;
a gear cover coupled to the input gear; and
a pressing member disposed between the input gear and the gear cover.

9. The transmission of claim 8, wherein the pressing member is configured to apply a force to the input gear so that the input gear and the output gear are engaged with each other and rotate together.

10. The transmission of claim 8, wherein, in response to an external force being applied to the output gear, the pressing member is elastically deformed to allow the input gear to move away from the output gear along the rotation axis so that the gear teeth of the input gear and the gear teeth of the output gear are permitted to slip with respect to each other.

11. The transmission of claim 8, wherein both opposing ends of the shift guide are connected to the output gear such that a combination of the shift guide and the output gear forms a closed curve.

12. The transmission of claim 1, wherein a proximal end of the connector connected to a distal end of the second guide is farther away from the first guide in the rotation direction of the shift lever than a distal end of the connector connected to the first guide, and
    wherein, as the shift guide rotates, the pawl member is configured to move from one of the first guide or the second guide toward the other thereof along a contact surface of the connector.

13. The transmission of claim 1, wherein, as the shift guide rotates, the extension applies a force to the pawl member disposed at the second guide, and
    wherein the shift lever is rotated due to the extension applying the force to the pawl member.

14. The transmission of claim 1, wherein the shift guide rotates in a first direction so that the pawl member moves from the first guide toward the second guide along the contact surface of the connector, so that the pawl member is dislodged from a detent groove corresponding to a current shift stage among the plurality of detent grooves,
    wherein while the pawl member is disposed at the second guide, the shift guide allows the extension to apply a force to the pawl member in the first direction to cause the shift lever to be rotated to a position corresponding to a target shift stage, and
    wherein, in response to the shift lever having been rotated to the position corresponding to the target shift stage, the shift guide rotates in a second direction opposite to the first direction so that the pawl member moves from the second guide toward the first guide along the contact surface of the connector, such that the pawl member is inserted into a detent groove corresponding to the target shift stage among the plurality of detent grooves.

15. The transmission of claim 1, further comprising a position sensor unit for detecting a position of the shift guide,
    wherein the position sensor unit includes a magnet mounted on the shift guide, and a magnetic sensor for detecting a magnetic force transmitted from the magnet.

16. The transmission of claim 1, further comprising:
a bullet disposed in the shift lever so as to be movable in the radial direction with respect to the rotation axis;
an elastic member that elastically supports the bullet; and
a detent groove including a plurality of grooves arranged along a rotation path of the bullet, wherein an end of the bullet is configured to be inserted into each of the plurality of grooves so that a manipulation feeling is generated when the shift lever rotates.

* * * * *